(No Model.) 2 Sheets—Sheet 2.

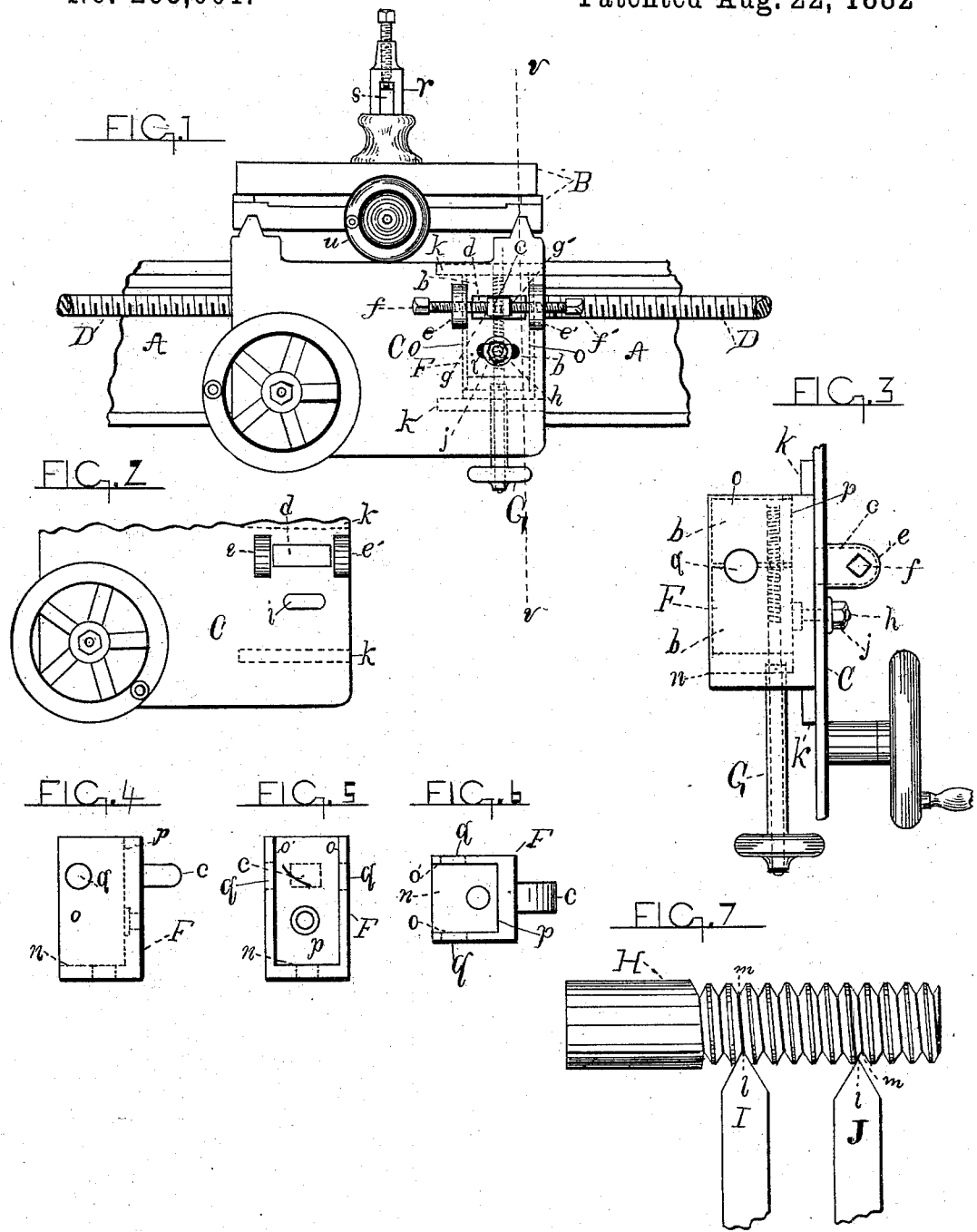

J. H. VINTON.
MACHINE FOR CUTTING SCREW THREADS.

No. 263,001. Patented Aug. 22, 1882.

Witnesses.
Nathaniel W. Vandegrift
Chas. H. Armstrong

Inventor.
John H. Vinton
By Geo. D. Phillips

United States Patent Office.

JOHN H. VINTON, OF BRIDGEPORT, CONNECTICUT, ASSIGNOR TO FRANK ARMSTRONG, OF SAME PLACE.

MACHINE FOR CUTTING SCREW-THREADS.

SPECIFICATION forming part of Letters Patent No. 263,001, dated August 22, 1882.

Application filed July 5, 1881. (No model.)

*To all whom it may concern:*

Be it known that I, JOHN H. VINTON, of Bridgeport, in the county of Fairfield and State of Connecticut, have invented a certain new and useful Improvement in Thread-Cutting Machines; and I do hereby declare that the following is a full, clear, and exact description of the invention, which will enable others skilled in the art to which it appertains to make and use the same.

The object of my invention is to facilitate the cutting of threads by setting and resetting the thread-cutting tools after they have been temporarily removed to be ground or repaired.

My invention is designed for lathes and all thread-cutting machines; and it consists of the proper mechanical arrangement, which will be hereinafter described, by which the carriage of the machine may be longitudinally adjusted when the machine is properly geared and the work in progress, and after the tool has been temporarily removed it may be reset in its former position in the unfinished thread and the work resumed.

Heretofore, in cutting threads, when the tool has become dulled and must be removed in order to be repaired, there was great difficulty and loss of time in placing the tool in the proper position in relation to the unfinished thread that it formerly occupied, and more especially on an inside thread.

In my improved device the carriage of the lathe or machine can be sufficiently adjusted to allow the tool to fit into the unfinished thread it formerly occupied with little labor and loss of time, and a better result obtained as to the condition of the work, as the tool will resume its cutting and not endanger or destroy the symmetry of the thread.

To more clearly understand my invention, reference is had to the drawings accompanying this specification, and forming a part thereof, in which—

Figure 1 represents a view of my device attached to an ordinary lathe, showing a part only of the lathe, just sufficient to illustrate the operation of my improvement. A is the bed of the lathe; B, the carriage; C, the apron attached to the carriage B and projecting downward, and having attached thereto the mechanism employed in operating and controlling the carriage B. D is the leading-screw, which engages, when cutting threads, with the two nuts or half-nuts $b$ $b$. F is a box provided for holding the nuts $b$ $b$, keeping them in place and preventing side play. The projection or lug $c$ of the box F projects through the elongated slot $d$ of the apron C. On the apron C are the stationary projecting lugs $e$ $e'$, which hold the adjusting-screws $f f'$. The ends $g$ $g'$ of the screws $f f'$ engage with the projecting lug $c$ of the box F, by which the carriage B is longitudinally adjusted as required. G is the tightening-screw, provided with a right and left hand thread to open and close the nuts $b$ $b$. $h$ is a bolt attached to the box F, and projecting through the elongated slot $i$ of the apron C, and holds the box F firmly against the apron C by the nut $j$.

Fig. 2 is a sectional view of the apron C, showing the elongated slot $d$ for the lug $c$ of the box F, and the elongated slot $i$ for the bolt $h$, and the projecting lugs $e$ $e'$, which hold the adjusting-screws $f f'$.

Fig. 3 represents an end view of the apron C, and also of the box F, holding the nuts $b$ $b$, showing more clearly the manner in which the box F is secured to the apron C by means of the bolt $h$. $k$ $k$ are ribs projecting from the apron C, which hold the box F in position and prevent its swinging or canting around when tightening the bolt $h$.

Fig. 4 represents a detached side view of the box F.

Fig. 5 is an elevation of the box F; Fig. 6, a top view of the same.

Fig. 7 represents a view of a screw in process of construction. H is the screw required to be cut. I is a tool properly set and adjusted. The angle of the tool is in the proper relation with the angle of the thread. J is a tool showing the position of a tool in reference to the thread in which the workman is liable to find it after it has been replaced but not adjusted.

Figure 8:
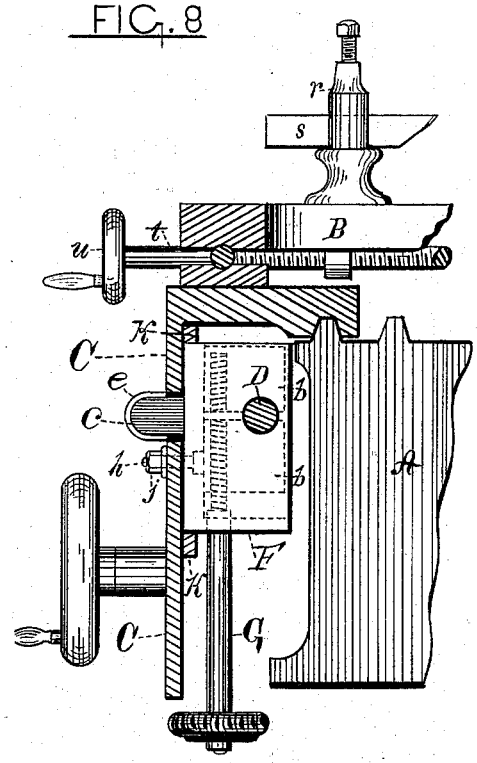

Fig. 8 represents an end view of Fig. 1, showing the apron C and carriage B in section, through the dotted line $v$, just forward of the lug $e'$ of the apron C; also showing the tool $s$, secured in the tool-post $r$. Said post is attached to the carriage B, which is operated and controlled by the screw $t$ and wheel-handle $u$.

Figure 9:
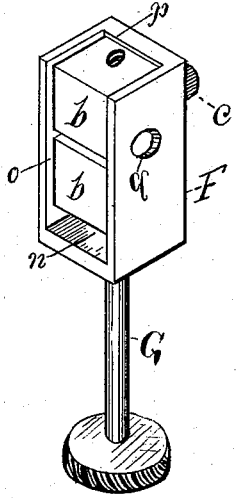

Fig. 9 is a perspective view of the box F and nuts $b\ b$.

Figure 10:
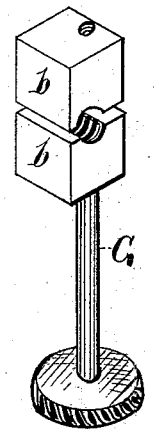

Fig. 10 is a view in perspective of the nuts $b\ b$, removed from the box F.

Figure 11:
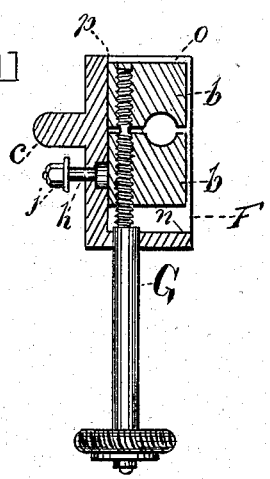

Fig. 11 is a sectional view of box F and nuts $b\ b$.

$r$, Fig. 1, is the tool-post for holding the tool.

The operation of my device is as follows: When the work required to be performed is in the process of operation, and before it is completed and the required size of the thread obtained, an accident is liable to happen to the tool—such as breaking or wearing away of the point—which prevents perfect work. It therefore becomes necessary to remove the tool and repair it; and on replacing and setting it by the thread-gage, so that the angle of the tool may correspond with the angle of the thread, it will be found that it does not match the thread, but will assume another position as regards the thread, as shown by the tool J, Fig. 7. The only remedy known and practiced by workmen is either to drive the point of the tool around until the point $l$ is on a line with the bottom $m$ of the thread, or disconnect the driving-gears and turn the leading-screw, thus moving the carriage longitudinally until the tool is properly placed, which is a great loss of time, and is a tedious and tiresome operation. The first method is a detriment to good work, as a perfect thread cannot be formed. When the tool has been replaced and in the position as shown at J, Fig. 7, all that is necessary is to turn the adjusting-screws $ff'$, (see Fig. 1,) which will carry the carriage holding the tool to the right or left, as required, until it is in its proper position, as indicated by the tool I, Fig. 7.

The adjustment of the carriage is only necessary when the lathe or machine is geared for cutting threads, and the nuts $b\ b$ brought in contact with the leading-screw D by the tightening-screw G, having right and left handed threads engaging with corresponding right and left threads of the nuts $b\ b$. The box F and the nuts $b\ b$, therein placed, remain stationary while the carriage is being moved or adjusted. The carriage is moved as follows: By loosening the screw $f$ its point $g$ is released from contact with the lug $c$ of the box F. Pressure is then brought to bear against the opposite side of the lug $c$ by the end $g'$ of the screw $f'$, which moves the carriage to the left. By reversing this operation said carriage is reversed to the right. The bolt $h$ and nut $j$, which hold the box F up to the apron C, are loosened just sufficient to allow the carriage to move, and can be tightened. The box F (see Figs. 4, 5, and 6) is constructed with the bottom $n$, the two sides $o\ o'$, and the back $p$, from which projects the lug $c$. The hole $q$ is provided in the sides $o\ o'$, through which the leading-screw D passes. The box F is necessary to hold the nuts $b\ b$, for, being in sections or halves, they would twist or cant and not raise or lower perpendicularly with the leading-screw.

In all lathes and screw-threading machines the box holding the nuts which engage with the leading-screw is secured to the carriage, which cannot be moved without disengaging the nuts from the leading-screw. In my improved device the carriage can be moved to the right or left, as required, when the nuts are in contact with the leading-screw, by means of the adjusting-screws $ff'$, in contact with the lug $c$ of the box F, as hereinbefore stated, thus rendering the carriage and nuts independent of each other, when necessary to move the carriage for the purpose of setting the tool in its proper relation to the unfinished thread.

The device as above described is of the greatest importance in cutting inside threads where it is very difficult to see the work, and still more difficult to adjust the tool by the old method, as described.

Having thus described my invention, what I claim as new, and desire to secure by Letters Patent, is—

1. In a machine or lathe for cutting threads, the combination, with the carriage holding the cutting-tool, of the box F, having lug $c$, partible nuts $b\ b$, the screw G for operating the nuts $b\ b$, and the adjusting-screws $ff'$, arranged to operate against the lug $c$ of the apron C to move the carriage back and forth independently of the leading-screw, as set forth.

2. The combination, with the nuts $b\ b$, of the box F, as described.

3. The combination, with the box F, having projecting lug $c$, the nuts $b\ b$, tightening-screw G, and leading-screw D, of the apron C, having elongated slot $d$ to permit a free movement of the carriage, and the lugs $e\ e'$, having screws $ff'$, which engage with the box F, as described.

In testimony that I claim the foregoing I have hereunto set my hand in the presence of two subscribing witnesses.

JOHN H. VINTON.

Witnesses:
NATHANIEL W. VANDEGRIFT,
CHAS. H. ARMSTRONG.